(12) United States Patent
Mukherjee et al.

(10) Patent No.: US 8,725,566 B2
(45) Date of Patent: May 13, 2014

(54) PREDICTING ADVERTISER KEYWORD PERFORMANCE INDICATOR VALUES BASED ON ESTABLISHED PERFORMANCE INDICATOR VALUES

(75) Inventors: Shibnath Mukherjee, Bangalore (IN); Ranjita Jatti Naik, Bangalore (IN); Shiva Manohar Singh, Bangalore (IN)

(73) Assignee: Microsoft Corporation, Redmond, VA (US)

( * ) Notice: Subject to any disclaimer, the term of this patent is extended or adjusted under 35 U.S.C. 154(b) by 86 days.

(21) Appl. No.: 13/337,709

(22) Filed: Dec. 27, 2011

(65) Prior Publication Data

US 2013/0166371 A1 Jun. 27, 2013

(51) Int. Cl.
*G06Q 30/00* (2012.01)

(52) U.S. Cl.
USPC ...................................... 705/14.41

(58) Field of Classification Search
USPC ...................................... 705/14.41
See application file for complete search history.

(56) References Cited

U.S. PATENT DOCUMENTS

| | | |
|---|---|---|
| 2002/0147754 A1 | 10/2002 | Dempsey et al. |
| 2005/0114198 A1 | 5/2005 | Koningstein et al. |
| 2005/0137939 A1 | 6/2005 | Calabria et al. |
| 2007/0027864 A1 * | 2/2007 | Collins et al. ............ 707/5 |
| 2007/0027865 A1 * | 2/2007 | Bartz et al. ............ 707/5 |
| 2008/0103902 A1 | 5/2008 | Burdick et al. |
| 2008/0120072 A1 * | 5/2008 | Bartz et al. ............ 703/2 |
| 2009/0299855 A1 | 12/2009 | Li et al. |
| 2010/0211454 A1 | 8/2010 | Shin et al. |
| 2011/0010239 A1 | 1/2011 | Vijay et al. |
| 2011/0173063 A1 | 7/2011 | Bhatia et al. |
| 2011/0208708 A1 | 8/2011 | Liu et al. |
| 2011/0264514 A1 | 10/2011 | Kwon et al. |
| 2012/0158489 A1 * | 6/2012 | Benyamin et al. ......... 705/14.45 |

FOREIGN PATENT DOCUMENTS

KR  10-2010-0035948  4/2010

OTHER PUBLICATIONS

Gleich, et al., "SVD Subspace Projections for Term Suggestion Ranking and Clustering", Technical Report, Yahoo! Research Labs, 2004 http://leonidzhukov.ru/papers/sigir04.pdf.

Carrasco, et al., "Clustering of Bipartite Advertiser-Keyword Graph", International Conference on Data Mining, 2003, Data mining workshop, 2003, published Nov. 19, 2003 http://citeseerx.ist.psu.edu/viewdoc/download?doi=10.1.1.4.8969&rep=rep1&type=pdf.

(Continued)

*Primary Examiner* — Thomas Dixon
(74) *Attorney, Agent, or Firm* — Joann Dewey; Doug Barker; Mickey Minhas (57) ABSTRACT

Methods, systems, and computer-readable storage media for predicting advertiser keyword performance indicator values based on proximity of advertisers to one another are provided. A keyword is received from a first advertiser that has not previously bid on the keyword. Another advertiser that is similar to the first advertiser and has previously bid on the keyword is identified, and a predicted performance indicator value for the keyword is calculated for the first advertiser based upon an established performance indicator value of the keyword for the other advertiser. In this way, performance predictions for an advertiser desiring to bid on a keyword that is new to that advertiser may be calculated more accurately than traditional methods that do not take into account advertiser similarity.

18 Claims, 6 Drawing Sheets

| | ADVERTISER ATTRIBUTES | | | | TARGETING ATTRIBUTES | | | |
|---|---|---|---|---|---|---|---|---|
| ADVERTISER | CATEGORY | QUALITY SCORE | AVG. PAY PER. CLICK | AVG BID | DAY OF WEEK | TIME OF DAY | GEOGRAPHIC LOCATION | IMPRESSIONS |
| ADDIDAS | RETAILER/ MANUFACTURE | 300 | 0.05 | 50 | 5 | 9 | MD | 100 |
| PUMA | RETAILER/ MANUFACTURE | 320 | 0.06 | 60 | 5 | 9 | MD | 180 |
| DICK'S SPORTING GOODS | RETAILER/ STORE | 110 | 0.0001 | 10 | 4 | 4 | CA | 40 |
| SOCCER.COM | RETAILER/ ONLINE | 800 | 0.04 | 110 | 2 | 10 | WA | 1050 |
| NIKE | RETAILER/ MANUFACTURE | 310 | 0.03 | 60 | 5 | 9 | MD | ? |

(56) References Cited

OTHER PUBLICATIONS

Liu, et al., "Automatic Characteristics Generation for Search Keywords in Paid Search Advertising", In Tepper School of Business, Research Showcase, Sep. 1, 2007 http://repository.cmu.edu/cgi/viewcontent.cgi?article=1327&context=tepper&sei-redir=1#search=%22keyword%20advertiser%20matrix%20%2B%20distance%20%2B%20vector%22.

International Search Report and Written Opinion for PCT/US2012/069319, mailed Mar. 20, 2013.

* cited by examiner

PREDICTING ADVERTISER KEYWORD PERFORMANCE INDICATOR VALUES BASED ON ESTABLISHED PERFORMANCE INDICATOR VALUES

BACKGROUND

Oftentimes advertisers use keyword advertising to market their goods and services to consumers. Keyword advertising uses specific words and phrases to target consumers. For example, if a consumer searches a particular keyword, targeted advertising banners will be displayed based on the searched keyword. Advertisers seek to generate increased consumption of their goods or services through images or messages designed to attract consumers. Online advertising may be delivered, for instance, by an ad server, on search engine results pages, via banner ads, and/or in text ads. Advertisers bid on keywords or phrases so their ads will be displayed to consumers when the keywords or phrases are used. Advertisers also track the success rates of keywords in the advertising marketplace. For example, impressions refer to the number of times an advertisement is displayed. Each time the advertisement is displayed it is counted as one impression. Tracking how keywords perform is important to advertisers because it is a key way in which Web advertising is accounted for and paid for.

SUMMARY

This Summary is provided to introduce a selection of concepts in a simplified form that are further described below in the Detailed Description. This Summary is not intended to identify key features or essential features of the claimed subject matter, nor is it intended to be used in isolation as an aid in determining the scope of the claimed subject matter.

Embodiments of the present invention relate to predicting advertiser keyword performance indicator values based on proximity of advertisers to one another. A keyword is received from a first advertiser that has not previously bid on the keyword. Another advertiser that is similar to the first advertiser and has previously bid on the keyword is identified, and a predicted performance indicator value for the keyword is calculated for the first advertiser based upon an established performance indicator value of the keyword for the other advertiser. Alternatively, a plurality of other advertisers is identified based upon a distance of similarity between the first advertiser and each of the plurality of other advertisers. In such instances, the predicted performance indicator value for the keyword for the first advertiser may be calculated based upon the established performance indicator value of the keyword for each of the plurality of other advertisers. For instance, the predicted performance indicator value for the keyword for the first advertiser may be calculated as an average of the established performance indicator values for the keyword for each of the plurality of other advertisers. In this way, performance predictions for an advertiser desiring to bid on a keyword that is new to that advertiser may be calculated more accurately than traditional methods that do not take into account advertiser similarity.

BRIEF DESCRIPTION OF THE DRAWINGS

Embodiments of the invention are described below with reference to the attached drawing figures, wherein.

DETAILED DESCRIPTION

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to systems, methods, and computer-readable storage media for, among other things, predicting advertiser keyword performance indicator values based on proximity of advertisers to one another. Advertiser keyword performance indicators may include a variety of different performance indicators including, without limitation, impressions, clicks, cost-per click, and conversions. A keyword is received from a first advertiser that has not previously bid on the keyword. Another advertiser that is similar to the first advertiser and has previously bid on the keyword is identified, and a predicted performance indicator value for the keyword is calculated for the first advertiser based upon an established performance indicator value of the keyword for the other advertiser. Alternatively, a plurality of other advertisers is identified based upon a distance of similarity between the first advertiser and each of the plurality of other advertisers. In such instances, the predicted performance indicator value for the keyword for the first advertiser may be calculated based upon the established performance indicator value of the keyword for each of the plurality of other advertisers. For instance, the predicted performance indicator value for the keyword for the first advertiser may be calculated as an average of the established performance indicator values for the keyword for each of the plurality of other advertisers. In this way, performance predictions for an advertiser desiring to bid on a keyword that is new to that advertiser may be calculated more accurately than traditional methods that do not take into account advertiser similarity.

Accordingly, in one embodiment, the present invention is directed to one or more computer-readable storage media storing computer-usable instructions that, when used by one or more computing devices, cause the one or more computing devices to perform a method for predicting advertiser keyword performance indicator values. The method includes receiving a keyword from a first advertiser, wherein the first advertiser has not previously bid on the keyword. The method further includes identifying at least one other advertiser that is similar to the first advertiser. The at least one other advertiser has previously bid on the keyword. The method also includes calculating at least one predicted performance indicator value for the keyword for the first advertiser based upon at least one established performance indicator value of the keyword for the at least one other advertiser.

In another embodiment, the present invention is directed to one or more computer-readable storage media storing computer-usable instructions that, when used by one or more computing devices, cause the one or more computing devices to perform a method for using a plurality of other advertisers for predicting advertiser keyword performance indicator values. The method includes receiving a keyword from a first advertiser, wherein the first advertiser has not previously bid on the keyword. The method further includes, identifying a subset of a plurality of other advertisers that have not previously bid on the keyword, based upon a distance of similarity between the first advertiser and each of the plurality of advertisers. The method also includes calculating at least one predicted performance indicator value for the keyword for the first advertiser based upon at least one established performance indicator value of the keyword for the subset of the plurality of other advertisers.

In yet another embodiment, the present invention is directed to a method for using a dataset of advertiser attributes for predicting advertiser keyword performance indicator values, the method being performed by one or more computing devices including at least one processor. The method includes receiving a keyword from a first advertiser, wherein the first advertiser has not previously bid on the keyword and the keyword is from a popular keyword list. The method further includes generating the dataset of advertiser attributes for the first advertiser and a plurality of other advertisers that have previously not bid on the keyword, wherein the process of generating the dataset of advertiser attributes comprises: receiving a plurality of attributes as variables in the dataset; and populating the dataset of advertiser attributes with values from an auction data store. The method further includes identifying a subset of the plurality of other advertisers, based upon the distance of similarity between the first advertiser and each of the plurality of other advertisers, wherein the distance of similarity is a Euclidean distance between a value of one or more attributes as they pertain to the first advertiser and a value of the one or more attributes as they pertain to each of the plurality of other advertisers. The method also includes calculating at least one predicted performance indicator value for the keyword for the first advertiser based upon the average of at least one established performance indicator value of the keyword for each of the plurality of other advertisers in the subset of the plurality of other advertisers.

Figure 1:
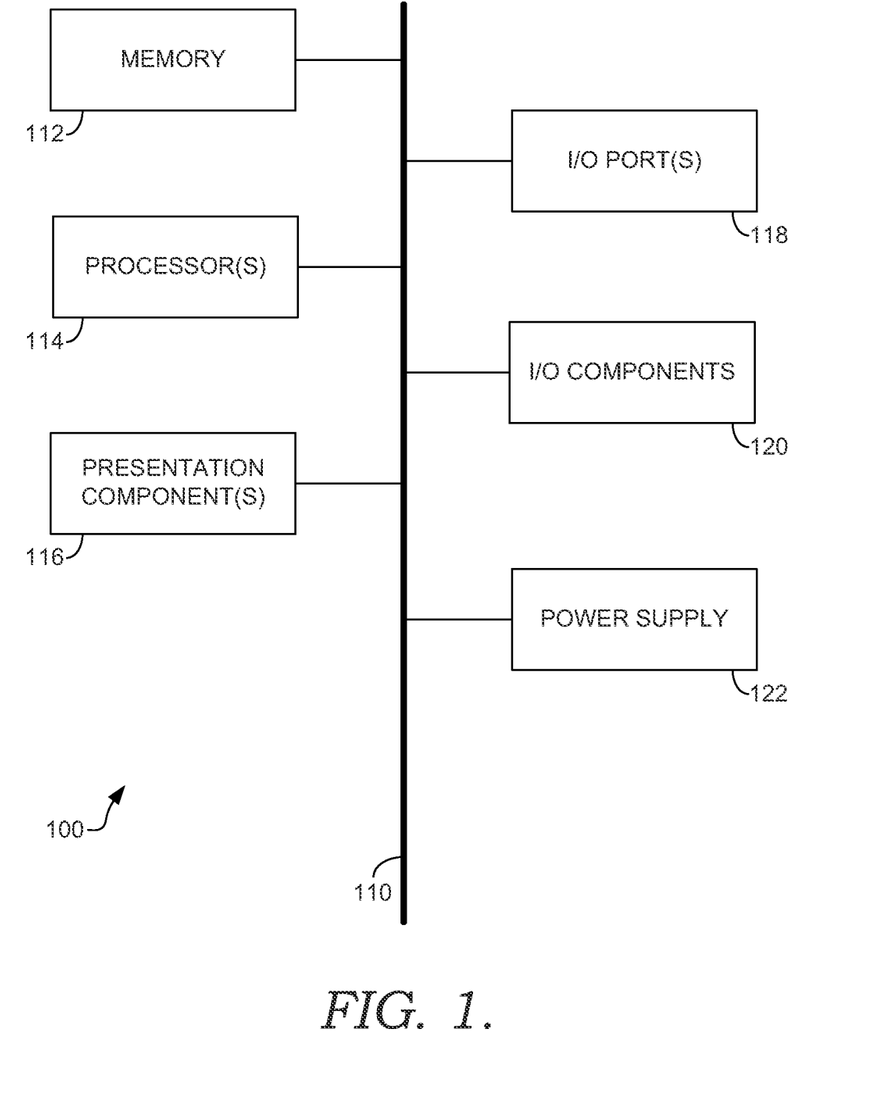
FIG. 1 is a block diagram of an exemplary computing environment suitable for use in implementing embodiments of the present invention.

An exemplary computing environment suitable for use in implementing embodiments of the present invention is described below in order to provide a general context for various aspects of the present invention. Referring to FIG. 1, such an exemplary computing environment is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules, including routines, programs, objects, components, data structures, etc., refer to code that performs particular tasks or implements particular abstract data types. Embodiments of the invention may be practiced in a variety of system configurations, including hand-held devices, consumer electronics, general-purpose computers, more specialty computing devices, and the like. Embodiments of the invention may also be practiced in distributed computing environments where tasks are performed by remote-processing devices that are linked through a communications network.

With continued reference to FIG. 1, the computing device 100 includes a bus 110 that directly or indirectly couples the following devices: a memory 112, one or more processors 114, one or more presentation components 116, one or more input/output (I/O) ports 118, I/O components 120, and an illustrative power supply 122. The bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computer" or "computing device."

The computing device 100 typically includes a variety of computer-storage media. By way of example, and not limitation, computer-readable media may comprise Random Access Memory (RAM); Read Only Memory (ROM); Electronically Erasable Programmable Read Only Memory (EEPROM); flash memory or other memory technologies; Compact Disk Read-Only Memory (CDROM), digital versatile disks (DVDs) or other optical or holographic media; magnetic cassettes, magnetic tape, magnetic disk storage or other magnetic storage devices; or any other medium that can be used to encode desired information and be accessed by computing device 100.

The memory 112 includes computer-storage media in the form of volatile and/or nonvolatile memory. The memory 112 may be removable, nonremovable, or a combination thereof. Exemplary memory includes solid-state memory, hard drives, optical-disc drives, etc. Computing device 100 includes one or more processors 114 that read data from various entities such as bus 110, memory 112 or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in. Illustrative I/O components 120 include a microphone, joystick, game pad, satellite dish, scanner, printer, wireless device, etc.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term "server" is often used herein, it will be recognized that this term may also encompass a search engine, a set of one or more processes distributed on one or more computers, one or more stand-alone storage devices, a set of one or more other computing or storage devices, a combination of one or more of the above, and the like.

Figure 2:
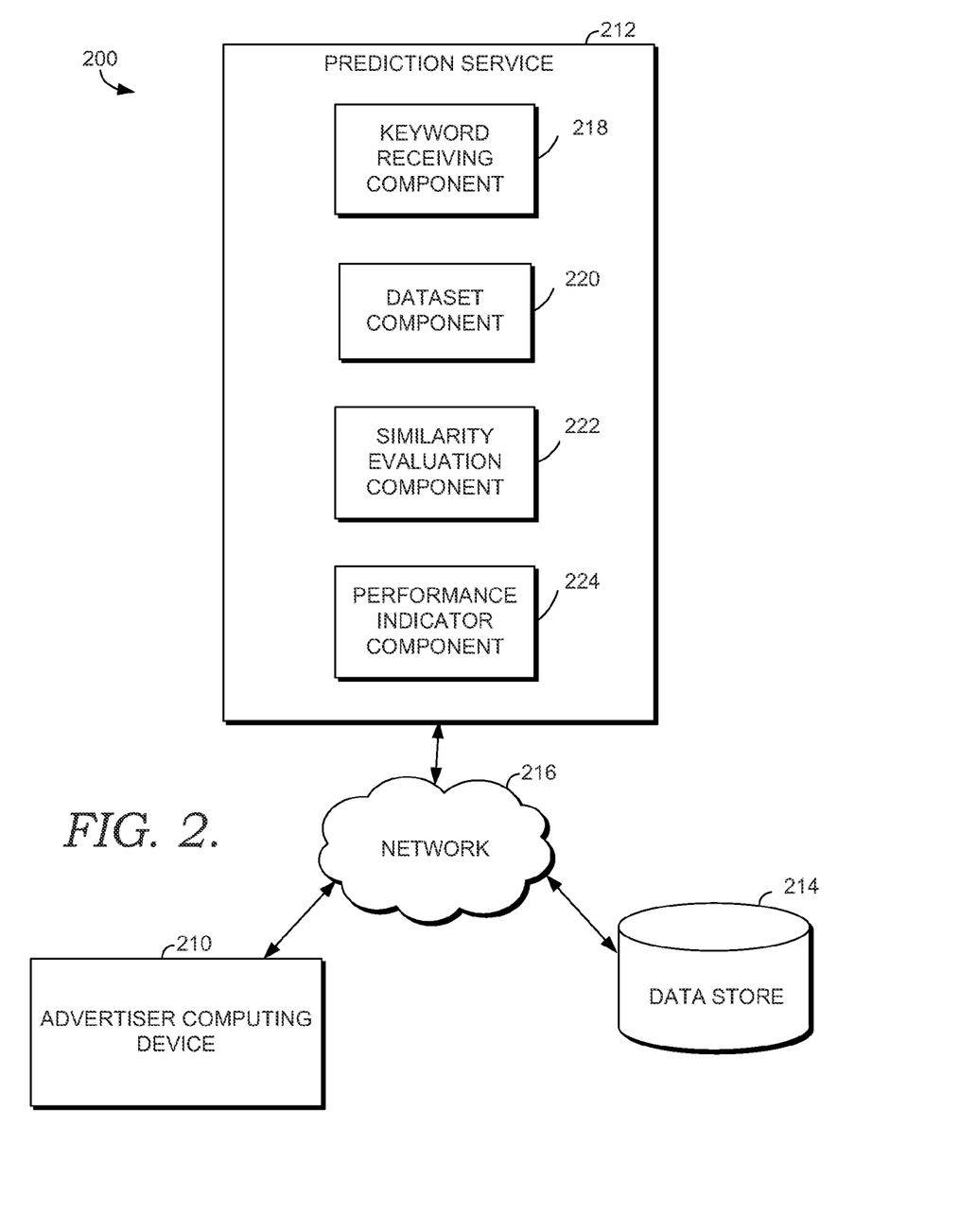
FIG. 2 is a block diagram of an exemplary computing system architecture suitable for use implementing embodiments of the invention.

Turning now to FIG. 2, a block diagram is illustrated of an exemplary computing system architecture 200 suitable for predicting advertiser keyword performance indicator values based on proximity of advertisers to one another. It will be understood and appreciated by those of ordinary skill in the art that the computing system architecture 200 shown in FIG. 2 is merely an example of one suitable computing system and is not intended to suggest any limitation as to the scope of the use or functionality of embodiments of the invention. Neither should the computing system architecture 200 be interpreted as having any dependency or requirement related to any single component/module or combination of components/modules illustrated therein.

The computing system environment 200 generally includes an advertiser computing device 210, a prediction engine 212, and a data store 214 all in communication with one another via a network 216. The network 216 may include, without limitation, one or more local area networks (LANs) and/or wide area networks (WANs). Such networking environments are commonplace in offices, enterprise-wide computer networks, intranets and the Internet. Accordingly, the network 216 is not further described herein.

One or more of the illustrated components/modules may be implemented as stand-alone applications. One or more of the illustrated components/modules may be integrated directly into, for example, the operating system of the advertiser computing device 210 or the prediction engine 212. The components/modules illustrated in FIG. 2 are exemplary in nature and in number and should not be construed as limiting. Any number of components/modules may be employed to achieve the desired functionality within the scope hereof. Further, components/modules may be located on any number of servers. By way of example only, the prediction engine 212 might reside on a server, cluster of servers, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components/modules, and in any suitable combination and location. Various functions described herein as being performed by one or more entities may be carried out by hardware, firmware, and/or software. For instance, various functions may be carried out by a processor executing instructions stored in memory.

The advertiser computing device 210 may include any type of computing device, such as the computing device 100 described with reference to FIG. 1, for example. By way of example only and not limitation, the advertiser computing device 210 may be a personal computer, desktop computer, laptop computer, handheld device, mobile handset, consumer electronic device, or the like. It should be noted, however, that the systems and methods described herein are not limited to implementation on such computing devices, but may be implemented on any of a variety of different types of computing devices within the scope of hereof.

The advertiser computing device 210 is configured to submit bids for various keywords to be utilized with keyword marketing efforts of an advertiser. The advertiser computing device 210 is further configured to submit requests for predicted keyword performance indicator values to aid in determining an appropriate value to place on a keyword bid, as more fully described below.

The data store 214 is configured to store information pertaining to advertiser networks. Advertising networks connect advertisers to ad spaces. For example, print ads, television ads, or internet ads. In this regard, the auction data store 220 may comprise advertising network data including Internet advertising data. The information stored in association with the data store 214 for an advertiser may be utilized to derive and populate the attributes in a dataset of advertiser attributes. As well, the information stored in association with the data store 214 may comprise related advertiser data. Related advertiser data comprises advertiser data associated with an advertiser including website URL, contact information, products and services. The content and volume of such information are not intended to limit the scope of embodiments of the present invention in any way. Further, though illustrated as a single, independent component, the data store 214 may, in fact, be a plurality of storage device, for instance a database cluster, portions of which may reside may reside with any of the other components in the exemplary architecture environment.

The prediction engine 212 is configured to predict advertiser keyword performance indicator values based on proximity of advertisers to one another. As shown, the prediction engine 212 includes a keyword receiving component 218, a dataset component 220, a similarity evaluation component 222, and a performance indicator component 224. In other embodiments, one or more of the components 218, 220, 222 and 224 may be integrated directly into the operating system of a computing device such as the advertiser computing device 210 or another external computing device (not shown). Alternatively, the computing system architecture 200 may reside in a distributed computing environment that includes multiple computing devices (e.g., servers and clients) coupled with one another via one or more networks. Such networks may include without limitation, one or more local area networks (LANs) and/or one or more wide area networks (WANs). Such network environments are commonplace in offices, enterprise-wide computer networks, intranets, and the internet. Accordingly, the network, or combination of networks, is not further described herein.

The keyword receiving component 218 is configured to receive a keyword, from a first advertiser, where the first advertiser has not previously bid on the keyword. The keyword received by the keyword receiving component 218 may comprise a word, a phrase, or any combination thereof, capable of being used by an advertiser to trigger directed advertising to a consumer. For example, a keyword phrase, "Soccer Cleats" may trigger a NIKE advertisement based on a consumer's search query. In one embodiment, the keyword may be based upon a popular list of advertising keywords. The popular keyword list may comprise words, phrases, or combinations thereof, which are known to generate advertising traffic for advertisers. The popular keyword may also comprise words, phrases, or combinations thereof, used by competitors of the first advertiser.

As previously mentioned, the first advertiser is an advertiser who has not previously bid on the keyword. Advertisers usually bid on keywords relevant to their target market. In a bid-based model, the advertiser may sign a contract that allows the advertiser to compete against other advertisers in a private auction hosted by an advertising network. In one embodiment a first advertiser has not previously bid on the received keyword while the at least one other advertiser has previously bid on the received keyword. Bidding for keywords and bid-based models are known to those of ordinary skill in the art, and accordingly, are not further described herein.

The dataset component 220 is configured to generate a dataset of advertiser attributes for the first advertiser and a plurality of other advertisers. The dataset component 220 receives attributes for the advertisers in the dataset. The dataset component 220 is also configured to populate the dataset of advertisers with values. In embodiments, the values of one or more attributes as they pertain to an advertiser are retrieved from an auction data store (e.g., data store 214).

Figure 3:
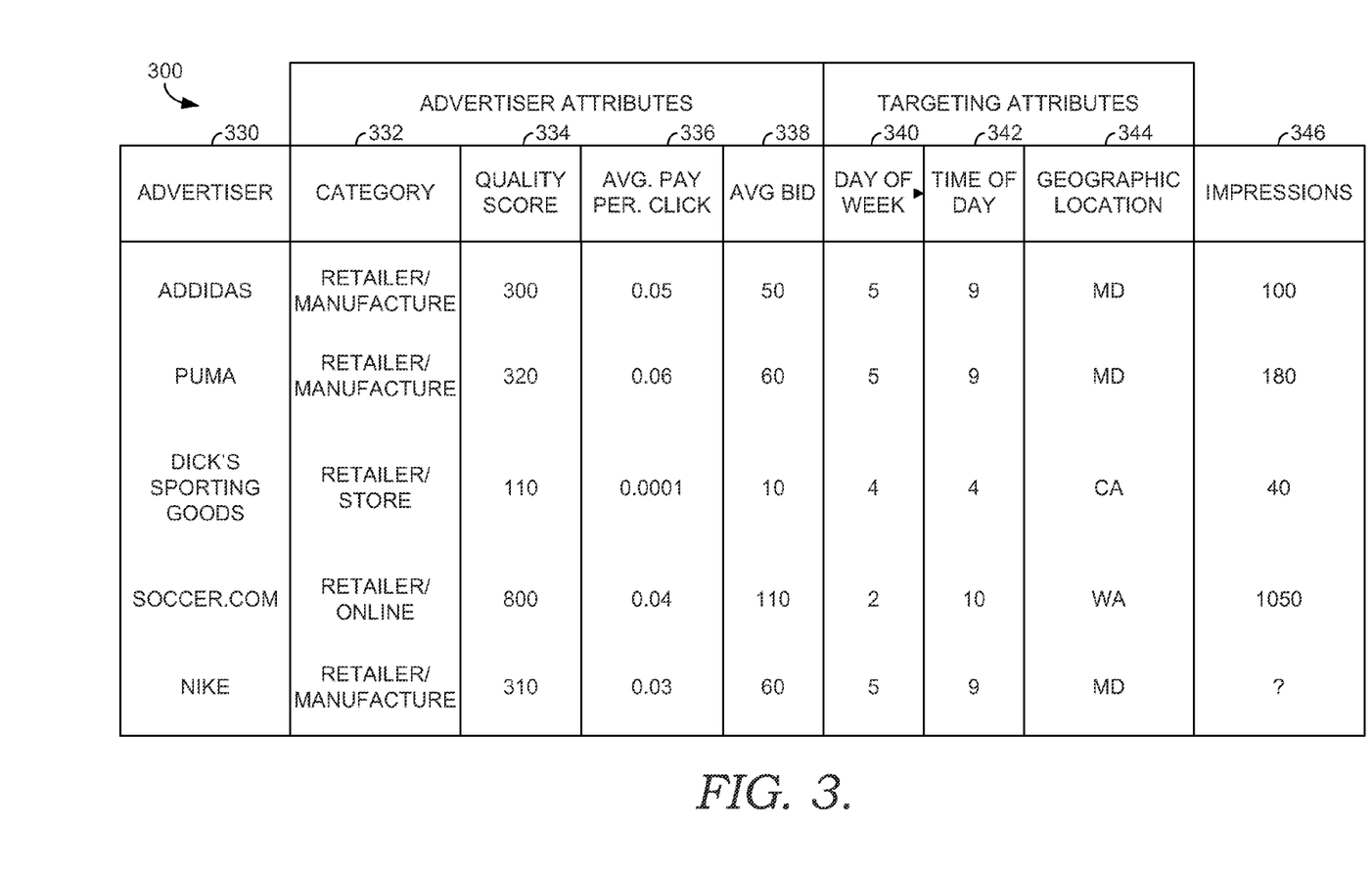
FIG. 3 is a schematic diagram showing a dataset of advertiser attributes and corresponding values associated with advertisers in the dataset, in accordance with embodiments of the invention.

In addition, the dataset of advertiser attributes may be a tabular representation or a representation in other format of advertisers with values associated with various attributes. By way of example, as shown in FIG. 3, the dataset may include NIKE, as a first advertiser, with a value for the attribute quality score. In general, attributes may include information describing the advertiser, which may be used to predict a performance indicator value. The attributes may be derived from information stored in association with advertisers in an auction data store (e.g., data store 214) of an advertising network. In this regard, attributes may include, without limitation, category, quality score, pay-per-click, bid, advertiser vertical, geographic location, day-targeting, day-parting, and keywords in common. Some of these attributes may be an average value, which represents or approximates the arithmetic mean of the attribute.

As shown in FIG. 3, in embodiments, the attributes may be separated into additional categories, which may include advertiser attributes 310 and targeting attributes 320. The advertiser attributes 310 may include, by way of example only, category, quality score, pay-per-click, and bid, and the targeting attributes may include, by way of example only, day-parting, time-parting, and geographic location. FIG. 3, which shows a dataset of advertiser attributes 300 and values associated with advertisers in the dataset, in accordance with embodiments of the invention will be explained in more detail after the components that generate the dataset of advertiser attributes are explained.

Returning to FIG. 2, in one embodiment, the dataset of advertiser attributes is stored in a hash table. A hash utilizes a hash function to map attributes to their associated values. The hash table allows for efficient processing of the entries in the dataset and may also be used to provide additional functionality in embodiments of the present invention.

The similarity evaluation component 222 is configured to do a number of things. For instance, the similarity evaluation component 222 is configured to identify at least one other advertiser that is similar to the first advertiser and has previously bid on the keyword. Using the keyword "Soccer Cleats" and the first advertiser, NIKE, the similarity evaluation component 222 may identify ADIDAS as a similar advertiser who has previously bid on the keyword "Soccer Cleats." In embodiments, identifying another advertiser may be done by calculating a Euclidean distance between a value of one or more attributes as they pertain to the first advertiser and a value of one or more attributes as they pertain to at least one other advertiser that has previously bid on the keyword. The Euclidean distance measures the distance between two points. The smaller the distance between a given attribute value as it pertains to two advertisers, the more similar the advertisers are based upon that attribute. In this regard, the Euclidean distance may be the distance between a value of one attribute as it pertains to a first advertiser and a value of the same attribute as it pertains to at least one other advertiser. For example, as shown, NIKE is a first advertiser with a quality score of 310 and ADIDAS and PUMA are other advertisers with quality scores of 300 and 320 respectively. Calculated on the feature quality score, the Euclidean distance between NIKE and ADIDAS is 10 and the Euclidean distance between NIKE and PUMA is 20. As a result, the Euclidean distances may be used to identify a similar advertiser, in this case ADIDAS.

In another embodiment, a similar advertiser may be identified based upon Euclidean distance calculated using an "attribute vector." The attribute vector represents the magnitude of one or more attributes in the dataset of advertiser attributes. The Euclidean distance measures the distance between two attribute vectors. A Manhattan distance equation is utilized to calculate the distance between the two attribute vectors of the first advertiser and at least one other advertiser to calculate the Euclidean distance between the two. The Manhattan distance equation is illustrated below:

$$\text{Distance} = \Sigma_{attributes} |\text{Vector}_{first\ advertiser} - \text{Vector}_{other\ advertiser}|$$

In yet another embodiment, if an attribute comprises a continuous variable, continuous variables may be converted to a categorical variable through a process called binning. Categorical variables represent data that can be divided into groups. For example, geographic location could be any of the 50 states (e.g., MD for Maryland). Continuous variables may take a range of values. For example, the attribute bid may have a range of values of 1 to 200. However, through binning, this continuous variable may be converted into ten categorical variables of ten values each (1-10, 11-20, 21-30, etc). In this regard, categorical variables may include, by way of example only, day targeting, day-parting, and geographic location, while continuous variables may include, by way of example only, quality score, pay per click and bid. In addition, the similarity evaluation component 222 is further configured to compare the keywords in common between two advertisers. The keywords in common attribute refers to the number of already bid-upon keywords a first advertiser has in common with another advertiser. The similarity between the already bid-upon keywords of a first advertiser and at least one other advertiser may be represented using a Jaccard similarity coefficient. The Jaccard similarity coefficient measures the keyword set of the first advertiser and the other advertiser and calculates the size of the intersection divided by the size of the union of the keyword set to find a value for the Keyword in Common attribute. The Jaccard similarity coefficient equation is illustrated below:

$$J(A, B) = \frac{|A \cap B|}{|A \cup B|}.$$

In other embodiments, the similarity evaluation component 222 is also configured to identify a subset of a plurality of other advertisers. The subset of the plurality of other advertisers may be identified based upon the distance of similarity between the first advertiser and each of the plurality of other advertisers. For example, as explained above, the Euclidean distance measures the distance between two points. The smaller the distance between attribute values of two advertisers, the more similar the advertisers are based upon that attribute. In this regard, as shown in FIG. 3, a subset of two other advertisers based on the proximity of the value of the quality score attribute, where NIKE is first advertiser, would include ADIDAS with distance of ten and PUMA with a distance of twenty, and exclude DICKS'S SPORTING GOODS and SOCCER.COM with proximity values of 100 and 490 respectively. In other embodiments, the distance of similarity may be between a value of one or more attributes as they pertain to the first advertiser and a value of the one or more attributes as they pertain to each of the plurality of other advertisers in the subset. Thus, the distance may be calculated based upon more than one value of the advertisers (e.g. an attribute vector).

The performance indicator component 224 is configured to calculate a predicted performance indicator value for the first advertiser. In the dataset of advertiser attributes, at least one other advertiser that has previously bid on a keyword may have an established performance indicator for a keyword. The performance indicator value may be based upon an established performance indicator of the keyword for the at least one other advertisers. In one embodiment, the at least one predicated performance indicator value based upon the average of at least one established performance indicator value of each of a plurality of other advertisers in the subset of a plurality of other advertisers. An average value of an established performance indicator represents or approximates the arithmetic mean of the established performance indicator value of the plurality of other advertisers in the subset. For example, as shown in FIG. 3, calculating the keyword performance indicator for impressions for NIKE based on a subset of ADIDAS and PUMA would be (100+180)/2=140. Where 100 and 180 represent the established performance indicator values for impressions for ADIDAS and PUMA respectively and 140 represents the predicted performance indicator value for impressions for NIKE.

In the performance indicator component 224, the advertiser keyword performance indicator value may be derived from information stored in association with advertisers in an auction data store (e.g., data store 214). In general, an advertiser keyword performance indicator may refer to any metric which advertisers or advertising networks use to measure the efficiency of a particular keyword in advertising. In this regard, advertiser keyword performance indicators, without limitation, may include impressions, clicks, cost-per-click and conversion rate. Impressions may be a measure of the number of times an ad is displayed. Each time the ad is displayed it is counted as one impression. Clicks may refer to click-through rates which measure the number of clicks on an ad divided by the number of times the ad is shown (impressions). For example, if keyword triggers a banner display 100 times (100 impressions) and receives five clicks, then the click-through rate is 0.05. Cost-per-click measures how much advertisers pay when an ad is clicked. Conversion rate measures a ratio of visitors who take an action based on viewing an ad presentation. For example, if a consumer clicks on an ad that directs the consumer to an advertiser's website and instead of navigating away from the advertiser's website, the user makes a purchase, submits a form, or performs an action for which the ad was intended, that interaction may count as a click-through or conversion. The terms defined above are well known in internet advertising models and are also well known to those of ordinary skill in the art and, accordingly, are not further described FIG. 3 shows a dataset of advertiser attributes 300 and values associated with attributes in the dataset, in accordance with embodiments of the invention. Embodiments of the present invention are not limited to the attributes shown in the dataset of advertiser attributes 300. Additional information could be included to help predict advertiser keyword performance indicator values.

As shown in FIG. 3, in embodiments, the attributes may be separated into additional categories which may include advertiser attributes 310 and targeting attributes 320. The illustrated advertiser attributes include: category 332, quality score 334, pay- or cost-per-click 336, and bid 338, and the illustrated targeting attributes include: day-parting 340, time-parting 342, and geographic location 344. The advertiser attribute 330 shows a list of advertisers that may or may not have previously bid on a keyword. The category attribute 332 may refer to the type of goods and services the advertiser provides. The category attribute 332 may also be made up of a combination of type of goods or services which the advertiser offers. The quality score attribute 334, may be a value used by advertising networks to determine the order in which ads are listed. The pay-per-click attribute 336 may be the amount of money advertisers pay publishers when the ad of the advertiser is clicked. The bid attribute 338 may be the amount of money an advertiser contracts to pay for a keyword so ads will be displayed to consumers when the keyword is used. Some of these attributes may be an average value, which represents or approximates the arithmetic mean of the attribute values. The advertiser vertical may be the specific industry within which the advertiser or the advertiser's network focuses the ads of the advertiser. For example, the NIKE vertical could be sporting shoes.

Targeting attributes, in general, may determine a target variable and provide advertising based on the particular target variable for a consumer. As illustrated, targeting variables include day-targeting 340, which may refer to the day of the week for which the targeting is done, day-parting 342, which may refer to the hour of the day for which the targeting is done, and geographic location 344, which may refer to state or other geographic location category (e.g., country, region, city, metro, zip code, organization, IP address) for which the targeting is done. Advertiser attributes and targeting attributes are well known in Internet advertising models and are also well known to those of ordinary skill in the art and, accordingly, are not further described.

Figure 4:
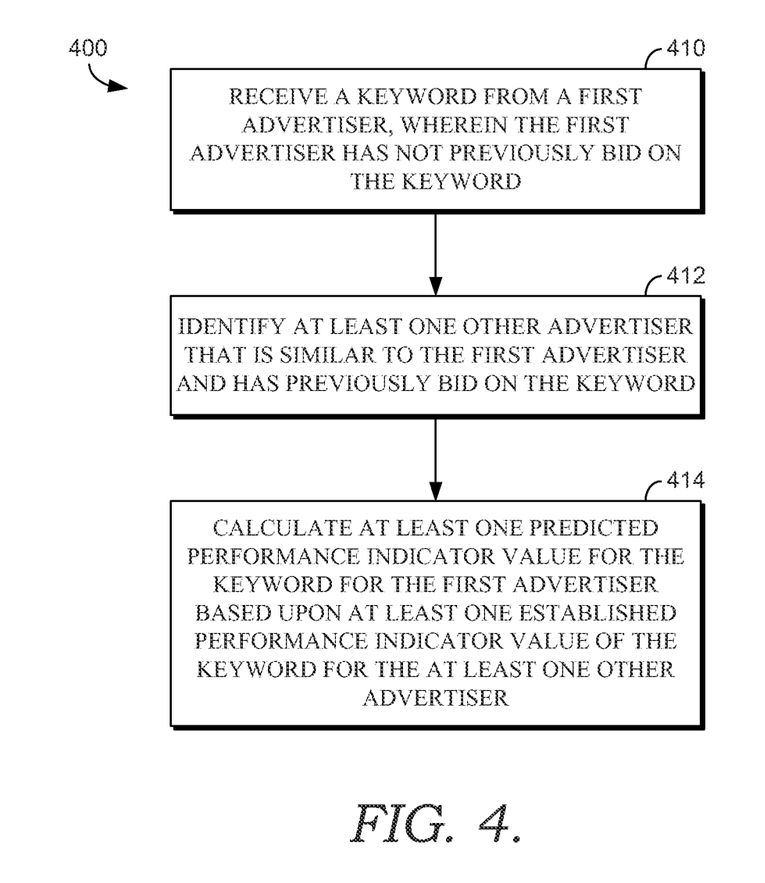
FIG. 4 is a flow diagram showing a method for predicting advertiser keyword performance indicator values, in accordance with embodiments of the invention.

Turning now to FIG. 4, a flowchart is illustrated showing a method 400 for predicting advertiser keyword performance indicators, in accordance with embodiments of the invention. As indicated at step 410, a keyword is received from a first advertiser. The first advertiser has not previously bid on the keyword. The keyword may be received by a keyword receiving component (e.g., keyword receiving component 218 of the prediction engine 212 of FIG. 2). The keyword may comprise words, phrases, or combinations thereof, used by an advertiser to trigger advertising to a consumer. For example, a keyword, "Soccer Cleats" may trigger a NIKE advertisement based on a search query of a consumer.

As indicated at step 412, at least one other advertiser that is similar to the first advertiser and has previously bid on the keyword, is identified. The at least one other advertiser may be identified by a similarity evaluation component (e.g., similarity evaluation component 222 of the prediction engine 212 of FIG. 2). Using the keyword "Soccer Cleats" and the first advertiser, NIKE, the similarity evaluation component 222 may identify ADIDAS as a similar advertiser who has previously bid on the keyword "Soccer Cleats." In embodiments, identifying at least one other advertiser may be made by calculating a Euclidean distance between a value of one or more attributes as they pertain to the first advertiser and a value of the one or more attributes as they pertain to at least one other advertiser that has previously bid on the keyword.

In another embodiment, the value of the one or more attributes as they pertain to the first advertiser and the at least one other advertiser are retrieved from an auction data store (e.g., data store 214). In general, attributes may include information describing the advertiser, which may be used to predict a performance indicator value. The attributes may be derived from information stored in association with advertisers in an auction data store (e.g., data store 214). In this regard, attributes may include, without limitation, category, quality score, pay-per-click, bid, advertiser vertical, geographic location, day-targeting, day-parting, and keywords in common. Some of these attributes may be an average value, which represents or approximates the arithmetic mean of the attribute.

As indicated at step 414, at least one predicted performance value for the keyword for the first advertiser is calculated, based upon at least one established performance indicator value of the keyword for the at least one other advertiser. The at least one predicted performance value may be predicted by a performance indicator component (e.g., performance indicator component 224 of the prediction engine 212 of FIG. 2). The at least one other advertiser may have an established performance indicator value for the keyword. The advertiser keyword performance indicator value may be derived from information stored in associated with advertisers in an auction data store (e.g., data store 214). In general, an advertiser keyword performance indicator may refer to any metric which advertisers or advertising networks use to measure the efficiency of a particular keyword in advertising. In this regard, advertiser keyword performance indicators, without limitation, may include impressions, clicks, costs-per-click and conversions.

Figure 5:
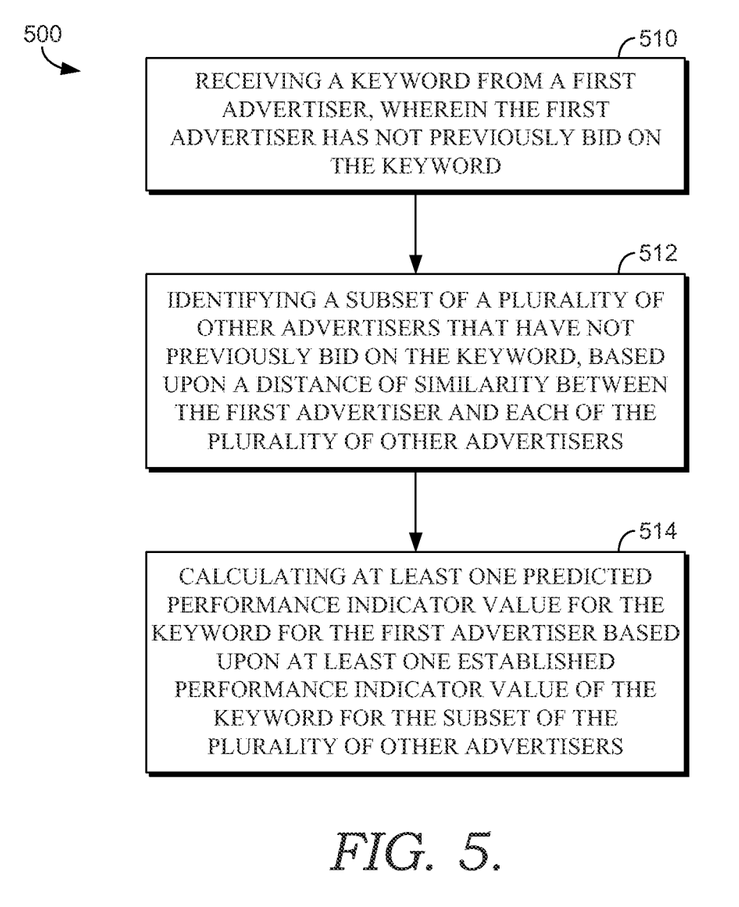
FIG. 5 is a flow diagram showing a method for using a plurality of other advertisers for predicting advertiser keyword performance indicator values.

Turning now to FIG. 5, a flowchart is illustrated showing a method 500 for using a plurality of other advertisers for predicting advertiser keyword performance indicator values. As indicated at step 510, a keyword is received from a first advertiser, wherein the first advertiser has not previously bid on the keyword. As indicated at step 512, a subset of a plurality of other advertisers that have previously bid on the keyword is identified, based upon a distance of similarity between the first advertiser and each of the plurality of other advertisers in the subset. The subset of the plurality of other advertisers may be generated by a similarity evaluation component (e.g., similarity evaluation component 222 of the prediction engine 212 of FIG. 2). The subset of the plurality of other advertisers may be identified based upon the distance of similarity between the first advertiser and each of the plurality of other advertisers in the subset of the plurality of other advertisers. For example, as explained above, the Euclidean distance measures the distance between two points. The smaller the distance between attribute values of the two advertisers, the more similar the advertisers are based upon that attribute. In this regard, as shown in FIG. 3, a subset of two other advertisers for NIKE as a first advertiser based on the proximity of the value of the quality score attribute would include ADIDAS with distance of ten and PUMA with a distance of twenty, and exclude DICKS'S SPORTING GOODS, and SOCCER.COM with proximity values of 100 and 490 respectively. In other embodiments, the distance of similarity may be between a value of one or more attributes as they pertain to the first advertiser and a value of the one or more attributes as they pertain to each of the plurality of other advertisers in the subset. Thus the distance may be calculated based upon more than one than one value of the advertisers (e.g., an attribute vector).

As indicated at step 514, at least one predicted performance indicator value for the keyword for the first advertiser is calculated, based upon at least one established performance indicator value of the keyword for the plurality of other advertiser in the subset of the plurality of other advertisers. In embodiments, calculating at least one predicted performance indicator value for the keyword for the first advertiser comprises calculating an average of at least one established performance indicator value for each of the plurality of other advertisers in the subset of the plurality of other advertisers. An average value of an established performance indicator represents or approximates the arithmetic mean of the established performance indicator value of the each of the plurality of other advertisers in the subset of the plurality of other advertisers. For example, as shown in FIG. 3, calculating the keyword performance indicator for impression for NIKE based on a subset of ADIDAS and PUMA would be (100+180)/2=140. Where 100 and 180 represent the established performance indicator values for impression for ADIDAS and PUMA respectively and 140 represents the predicted performance indicator value for impression for NIKE.

Figure 6:
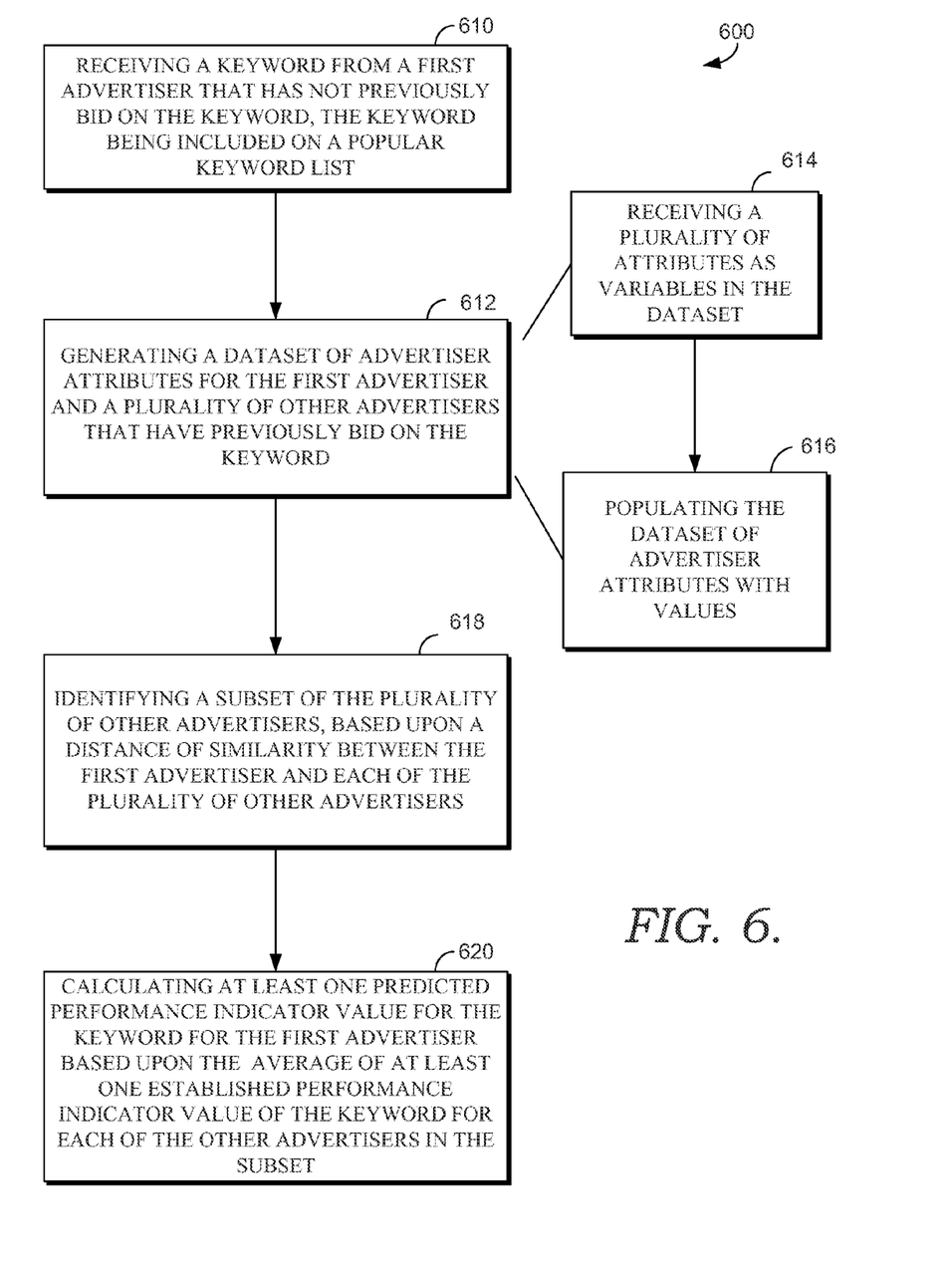
FIG. 6 is a flow diagram showing a method for using a dataset of advertiser attributes for predicting advertiser keyword performance indicator values.

Turning now to FIG. 6, a method 600 for using a dataset of advertiser attributes for predicting advertiser keyword performance indicator values is shown according to embodiments of the present invention. As indicted at step 610, a keyword is received from a first advertiser, wherein the first advertiser has not previously bid on the keyword and the keyword is from a popular keyword list. As explained previously, advertisers bid on keywords so their ads will be displayed when the keywords are used. The popular keyword list may be words, phrases, or combinations thereof, which are known to generate substantial advertising traffic for advertisers. The popular keyword may also be words, phrases, or combinations thereof, used by the competitors of the first advertiser.

As indicated at step 612, a dataset of advertiser attributes is generated for the first advertiser and a plurality of other advertisers that have previously bid on the keyword. The dataset of advertiser attributes may be generated by a dataset component (e.g., dataset component 220 of the prediction engine 212 of FIG. 2). Generating the dataset includes receiving attributes for the advertisers in the dataset (as indicated at block 614) and populating the dataset of advertiser attributes with values from an auction data store (e.g., data store 214 of FIG. 2), as indicated at block 616. In one embodiment, the generated dataset of advertiser attributes may be stored in hash. A hash utilizes a hash function to map attributes to their associated values. The hash table allows for efficient processing of the entries in the dataset and may also be used to provide additional functionality in the present invention.

As indicated at step 618, a subset of the plurality of other advertisers is identified, based upon a distance of similarity between the first advertiser and each of the plurality of other advertisers. The distance of similarity is a Euclidean distance between a value of one or more attributes as they pertain to the first advertiser and a value of the one or more attributes as they pertain to each of the plurality of other advertisers in the subset of the plurality of other advertisers.

As indicated at step, 620, at least one predicted performance indicator value for the keyword for the first advertiser is calculated, based upon an average of at least one established performance indicator value for each of the plurality of other advertisers in the subset of the plurality of other advertisers. An average value of an established performance indicator represents or approximates the arithmetic mean of the established performance indicator value of the plurality of other advertisers in the subset.

As can be understood, aspects of the present invention provide systems and methods for predicting advertiser keyword performance indicator values based upon proximity of advertisers to one another. The present invention has been described in relation to particular aspects, which are intended in all respects to be illustrative rather than restrictive. Alternative aspects will become apparent to those of ordinary skill in the art to which the present invention pertains without departing from its scope.

While the invention is susceptible to various modifications and alternative constructions, certain illustrated aspects thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

It will be understood by those of ordinary skill in the art that the order of steps shown in the method 400 of FIG. 4, method 500 of FIG. 5, and the method 600 of FIG. 6 are not meant to limit the scope hereof in any way and, in fact, the steps may occur in a variety of different sequences. Any and all such variations, and any combination thereof, are contemplated to be within the scope of aspects of the present invention.

The invention claimed is:

1. One or more computer-readable storage media hardware memory devices storing computer-usable instructions that, when used by one or more computing devices, cause the one or more computing devices to perform a method for predicting advertiser keyword performance indicator values, the method comprising:
    receiving a keyword from a first advertiser, wherein the first advertiser has not previously bid on the keyword;
    identifying at least one other advertiser that is similar to the first advertiser and has previously bid on the keyword; and
    calculating at least one predicted performance indicator value for the keyword for the first advertiser based upon at least one established performance indicator value of the keyword for the at least one other advertiser, wherein the at least one predicted performance indicator and the at least one established performance indicator each comprise one or more of impressions, clicks, cost-per-click, and conversions.

2. The one or more computer-readable storage media of claim 1, wherein identifying the at least one other advertiser that is similar to the first advertiser comprises calculating a Euclidean distance between a value of one or more attributes as they pertain to the first advertiser and a value of the one or more attributes as they pertain to the at least one other advertiser that has previously bid on the keyword.

3. The one or more computer-readable storage media of claim 2, wherein the value of the one or more attributes as they pertain to the first advertiser and the at least one other advertiser are retrieved from an auction data store.

4. The one or more computer-readable storage media of claim 2, wherein the one or more attributes include at least one of:
    (1) category;
    (2) quality score;
    (3) pay-per-click;
    (4) bid;
    (5) advertiser vertical;
    (6) geographic location;
    (7) day-targeting;
    (8) day-parting; and
    (9) keywords in common.

5. The one or more computer-readable storage media of claim 4, wherein the one or more attributes include keywords in common attribute, and wherein the value of the keywords in common attribute is based upon a Jaccard similarity coefficient between the first advertiser and the at least one other advertiser.

6. The one or more computer-readable storage media of claim 4, wherein the one or more attributes of quality score, pay-per-click and bid are represented by continuous variables, and wherein one or more of the continuous variables of the one or more attributes are converted to categorical variables by binning the continuous variables.

7. One or more computer-readable storage media hardware memory devices storing computer-usable instructions that, when used by one or more computing devices, cause the one or more computing devices to perform a method for using a plurality of other advertisers for predicting advertiser keyword performance indicator values, the method comprising:
    receiving a keyword from a first advertiser, wherein the first advertiser has not previously bid on the keyword;
    identifying a subset of a plurality of other advertisers that have previously bid on the keyword, the subset being identified based upon a distance of similarity between the first advertiser and each of the plurality of other advertisers; and
    calculating at least one predicted performance indicator value for the keyword for the first advertiser based upon at least one established performance indicator value of the keyword for the subset of the plurality of other advertisers, wherein calculating the at least one predicted performance indicator value for the keyword for the first advertiser comprises calculating an average of the at least one established performance indicator value for each of the plurality of other advertisers in the subset of the plurality of other advertisers.

8. The one or more computer-readable storage media of claim 7, wherein the distance of similarity between the first advertiser and each of the plurality of other advertisers is a Euclidean distance between a value of one or more attributes as they pertain to the first advertiser and a value of the one or more attributes as they pertain to each of the plurality of other advertisers.

9. The one or more computer-readable storage media of claim 8, wherein the value of the one or more attributes as they pertain to the first advertiser and the value of the one or more attributes as they pertain to each of the plurality of other advertisers are retrieved from an auction data store.

10. The one or more computer-readable storage media of claim 8, wherein the one or more attributes include at least one of:
    (1) category;
    (2) quality score;
    (3) pay-per-click;
    (4) bid;
    (5) advertiser vertical;
    (6) geographic location;
    (7) day-targeting;
    (8) day-parting; and
    (9) keywords in common.

11. The one or more computer-readable storage media of claim 10, wherein the one or more attributes include the keywords in common attribute, and wherein the value of the keywords in common attribute is based upon a Jaccard similarity coefficient between the first advertiser and the at least one other advertiser.

12. The one or more computer-readable storage media of claim 10, wherein the one or more attributes of quality score, pay-per-click and bid are represented by continuous variables, and wherein one or more of the continuous variables of the one or more attributes are converted to categorical variables by binning the continuous variables.

13. The one or more computer-readable storage media of claim 7, wherein the at least one predicted performance indicator and the at least one established performance indicator each comprise one or more of impressions, clicks, cost-per-click, and conversions.

14. A method for using advertiser attributes for predicting advertiser keyword performance indicators, the method being performed by one or more computing devices including at least one processor, the method comprising:

receiving using the at least one processor a keyword from a first advertiser, wherein the first advertiser has not previously bid on the keyword and the keyword is present on a popular keyword list;

generating a dataset of advertiser attributes for the first advertiser and a plurality of other advertisers that have previously bid on the keyword, wherein the process of generating the dataset of advertiser attributes comprises:

receiving a plurality of attributes as variables in the dataset; and populating the dataset of advertiser attributes with values from an auction data store;

identifying a subset of the plurality of other advertisers, based upon a distance of similarity between the first advertiser and each of the plurality of other advertisers, wherein the distance of similarity is a Euclidean distance between a value of one or more attributes as they pertain to the first advertiser and a value of the one or more attributes as they pertain to each of the plurality of other advertisers; and calculating using the at least one processor at least one predicted performance indicator value for the keyword for the first advertiser based upon the average of at least one established performance indicator value of the keyword for each of the plurality of other advertisers in the subset of the plurality of other advertisers.

15. The method of claim 14, wherein the dataset of advertiser attributes for the first advertiser and the plurality of other advertisers is stored in a hash.

16. The method of claim 14, wherein the one or more attributes include at least one of:
(1) category;
(2) quality score;
(3) pay-per-click;
(4) bid;
(5) advertiser vertical;
(6) geographic location;
(7) day-targeting;
(8) day-parting; and
(9) keywords in common.

17. The method of claim 14, wherein the one or more attributes include keywords in common attribute, and wherein the value of the keywords in common attribute is based upon a Jaccard similarity coefficient between the first advertiser and each of the at least one other advertisers.

18. The method of claim 14, wherein the at least one predicted performance indicator and the at least one established performance indicator each comprise one of impressions, clicks, cost-per-click, and conversions.

* * * * *